US006376982B1

(12) United States Patent
Bill et al.

(10) Patent No.: US 6,376,982 B1
(45) Date of Patent: Apr. 23, 2002

(54) ELECTRIC DISCHARGE LAMP AND LUMINESCENT MATERIAL AND COMPOUND

(75) Inventors: Hans Bill, Plan-les-Ouates; Hans Hagemann, Perly; Frank Kubel, Genève, all of (CH)

(73) Assignee: Universite de Geneve, Geneva (CH)

( * ) Notice: Subject to any disclaimer, the term of this patent is extended or adjusted under 35 U.S.C. 154(b) by 0 days.

(21) Appl. No.: 09/509,499

(22) PCT Filed: Sep. 28, 1998

(86) PCT No.: PCT/CH98/00412

§ 371 Date: Jun. 23, 2000

§ 102(e) Date: Jun. 23, 2000

(87) PCT Pub. No.: WO99/17340

PCT Pub. Date: Apr. 8, 1999

(30) Foreign Application Priority Data

Sep. 29, 1997  (CH) .............................................. 2277/97

(51) Int. Cl.$^7$ .............................................. H01J 63/04
(52) U.S. Cl. ...................................................... 313/486
(58) Field of Search ................................ 313/486, 487; 252/301.4 H

(56) References Cited

U.S. PATENT DOCUMENTS 3,693,006 A    9/1972  Chenot ........................ 313/109
4,109,152 A    8/1978  Aoki et al. .................. 250/486
4,138,529 A    2/1979  Mori et al. .................. 428/539
4,336,154 A    6/1982  Nishimura et al. ......... 252/301.4
4,587,036 A  * 5/1986  Degenhardt .......... 252/301.4 H

FOREIGN PATENT DOCUMENTS

EP    0 591 746    4/1994
FR    2 355 899    1/1978

* cited by examiner

Primary Examiner—Nimeshkumar D. Patel
Assistant Examiner—Thelma Sheree Clove
(74) Attorney, Agent, or Firm—Foley & Lardner

(57) ABSTRACT

An electric discharge lamp comprises a case with a transparent wall wherein the inner surface is coated with a luminescent material layer. The luminscent material is at least partially made up of a luminescent compound of general formula: $Ba_{7-x-y} M_x Eu_y F_{12} X_u Y_v$. In this formula, M is selected among calcium, magnesium, strontium and zinc; X and Y each represent an element selected among chlorine and bromine; x, u, and v range between 0 and 2, with u+v=2; and y ranges between 0.00001 and 2. The luminescent compound has high values of light output intensity, in the spectrum visible part, for excitation wavelengths higher than 300 nanometers. Thus it is possible to use an excitation radiation less actinic than in the case of discharge lamps of prior art, while avoiding the presence of mercury in the atmosphere contained in the case. The invention, therefore, makes it possible to decrease the dangerous physiological effects on living beings and to eliminate risk of mercury pollution.

12 Claims, 2 Drawing Sheets

ELECTRIC DISCHARGE LAMP AND LUMINESCENT MATERIAL AND COMPOUND

The present invention relates to an electric discharge lamp, comprising an envelope at least part of which consists of a transparent wall whose inner surface is at least partly covered with a coating of luminescent material capable of emitting visible light due to the effect of being irradiated by ultraviolet excitation radiation, the lamp furthermore comprising means for producing such radiation.

Such an electric lamp, also commonly denoted by the term "fluorescent lamp" or "fluorescent tube", is usually made in tubular form, its envelope generally consisting of a sealed glass tube and the excitation radiation coming from an electrcial discharge supported in an inert gas atmosphere, under a pressure below atmospheric pressure, for example argon, under a pressure of 0.01 to 40 mmHg, contained inside the envelope.

In accordance with the current prior art, the luminescent materials normally used in lamps of the abovementioned kind require so-called "hard" ultraviolet radiation to excite them, that is to say radiation having a wavelength less than a value of about 300 nm, such as 254 nm radiation produced by the excitation of a small amount of mercury contained in the said inert gas atmosphere.

Such ultraviolet radiation is strongly actinic and the irradiation by this radiation is capable of causing dangerous physiological effects in living creatures. In the manufacture of discharge lamps intended for illumination, although glass envelopes having a high coefficient of ultraviolet radiation absorption are used, it has been found that the emission of "hard" ultraviolet radiation in the usual fluorescent tubes is not insignificant, so that prolonged exposure to the light emitted by these tubes is not without health risks.

Moreover, the use of mercury, even in small amounts (for example corresponding to a partial pressure of about 0.007 mmHG at 20° C.) in the inert gas atmosphere of discharge lamps carries a significant risk of pollution, both during manufacture of the lamps and during disposal of spent lamps, despite the protective measures usually taken.

The invention aims to eliminate the abovementioned risks.

For this purpose, the lamp according to the invention is characterized in that the said luminescent material consists at least partly of a luminescent compound of formula:

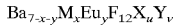

$$Ba_{7-x-y}M_xEu_yF_{12}X_uY_v$$

in which
M represents at least one divalent metal chosen from celcium, magnesium, strontium and zinc;
x is a number between 0 and 2;
y is a number between 0.00001 and 2;
X and Y each represent an element, which is identical or different, chosen from chlorine and bromine; and
u and v are numbers 0 and 2, the sum of which is equal to 2.

Advantageously, the luminescent material may contain, in addition to the said luminescent compound, auxiliary substances, especially one or more alkali or alkaline-earth metal halides and/or at least one mixed salt of such halides, making it possible to modify its physical properties such as its rheological characteristics and its adhesion to the substrate to which it has to be applied.

Such a luminescent material exhibits high values of light emission intensity, in the visible part of the spectrum, for excitation wavelengths corresponding to the range of so-called "soft" ultraviolet radiation, that is to say greater than 300 nanometres, whereas the luminescent materials currently used in the fluorescent tubes have a very low emission intensity for such excitation radiation wavelengths.

This makes it possible, in particular, to use, as excitation radiation, radiation having a 337 nm wavelength generated by an electrical discharge in an atmosphere of molecular nitrogen ($N_2$) [optionally containing a small amount of a rare gas such as neon] under a pressure of about 0.2 to 20 mmHg. The two risks mentioned above are thus eliminated since the discharge lamp is completely free of mercury and it uses excitation radiation much less actinic than that for the fluorescent tubes according to the prior art.

The invention also relates to a luminescent material capable of emitting visible light due to the effect of being irradiated by ultraviolet excitation radiation, characterized in that it consists at least partly of a luminescent compound of formula:

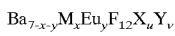

$$Ba_{7-x-y}M_xEu_yF_{12}X_uY_v$$

in which
M represents at least one divalent metal chosen from calcium, magnesium, strontium and zinc;
x is a number between 0 and 2;
y is a number between 0.00001 and 2;
X and Y each represent an element, which is identical or different, chosen from chlorine and bromine; and
u and v are numbers between 0 and 2, the sum of which is equal to 2.

The invention furthermore relates to the luminescent compound as defined above.

Advantageously, the said luminescent compound contains, in addition to europium, oxygen in the form of ionized atoms inserted into cationic and/or interstitial sites and into anionic and/or interstitial sites in its crystal lattice respectively, in an amount suitable for activating its light-emitting properties.

According to one particularly advantageous embodiment, the luminescent compound corresponds to the formula:

$$Ba_{7-x-y}M_xEu_yF_{12}Cl_2$$

in which M, x and y have the meanings indicated above.

One particular embodiment of the discharge lamp according to the invention will now be described in detail, as a non-limiting example, with reference to the appended drawing in which.

Figure 4:
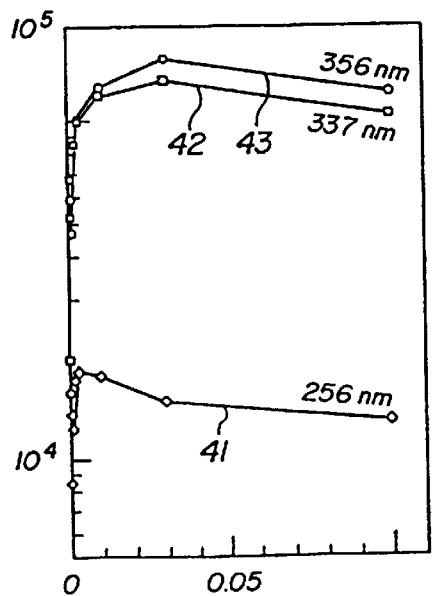
Figure 5:
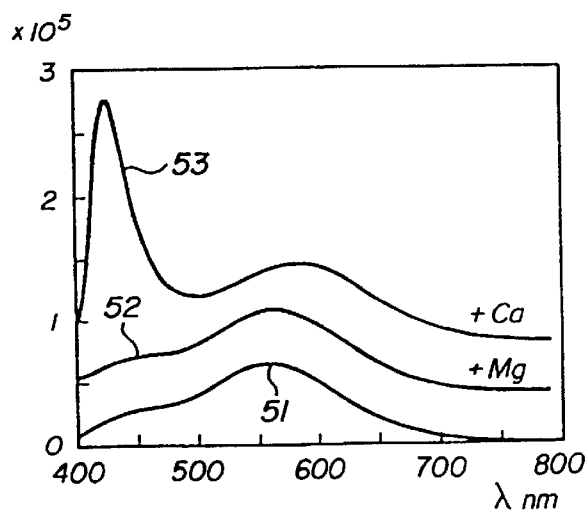

FIG. 4 is a diagram showing the influence of the europium content on the luminescence intensity in the case of the first crystal habit of the mineral compound constituting the essential element of the luminescent material according to the invention, and FIG. 5 is a diagram showing the influence of the partial substitution of barium with calcium or magnesium on the intensity and the spectral distribution of the luminescence, again in the case of the first crystal habit of the said mineral compound.

Figure 1:
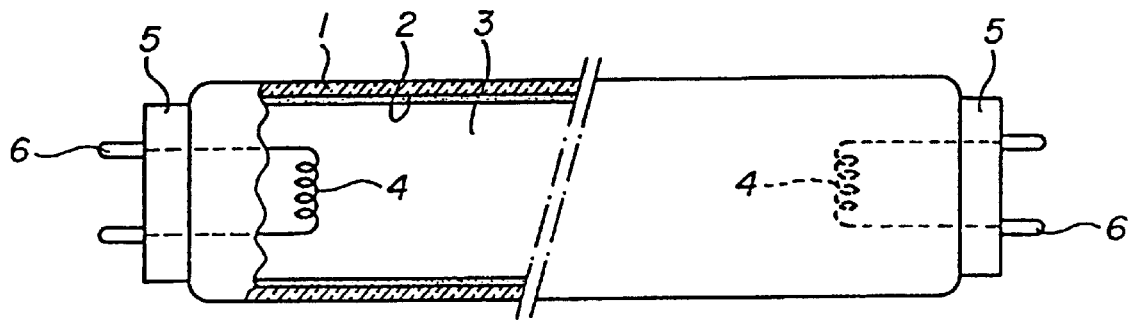
FIG. 1 is a schematic view, in perspective, partially exploded and with a part shown in section, of the discharge lamp according to the invention.

The discharge lamp illustrated in FIG. 1 comprises a tubular envelope 1 made of a material transparent to visible light but essentially opaque to ultraviolet radiation having wavelengths less than approximately 400 nm. For example, the envelope 1 may be made of glass. Both ends of the envelope 1 are hermetically sealed, in the usual manner, by a metal cap 5 joined to the envelope by welding, by sintering or fritting or by adhesive bonding, for example. The internal space 3 of the envelope 1 holds a nitrogen atmosphere (optionally containing a fraction of a rare gas such as neon) under a pressure of between 0.01 and 20 mmHg, with no auxiliary metal, and in particular without any trace of mercury. Electrodes in the form of filaments 4, for example consisting of a thin tungsten or tantalum wire covered with a protective coating made of a mixture of barium oxide BaO and thorium oxide $ThO_2$, are placed at each end of the internal space of the envelope and connected, in a manner per se, via terminals 6 to an electrical supply circuit (not illustrated), making it possible to apply a potential difference between these electrodes which are capable of causing a series of electrical discharges in the nitrogen atmosphere with the emission of characteristics ultraviolet radiation. As is known, this radiation includes two intensity peaks at wavelengths of 337 nm and 428 nm, receptively.

Figure 2A:
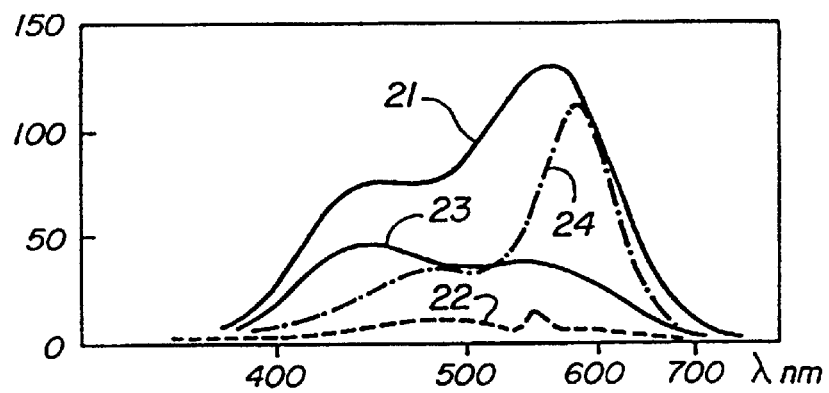
FIGS. 2a and 2b are comparative diagrams showing the characteristic light-emission curves for a first crystal habit of the mineral compound contained in the luminescent material according to the invention and for a luminescent material according to the prior art, for various excitation radiation wavelengths.
Figure 2B:
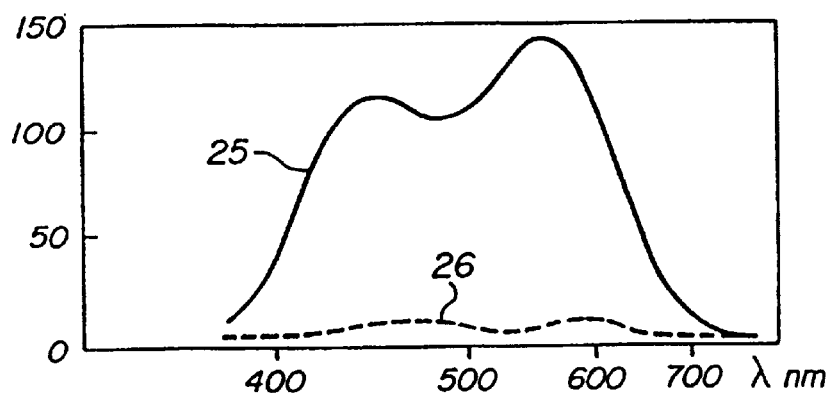

The diagrams in FIG. 2a and FIG. 2b make it possible to compare the luminescence light-emission characteristics of the compound of formula $Ba_{6.998}Eu_{0.002}E_{12}Cl_2$, in a first hexagonal crystal habit of structure corresponding to the $P6_3/m$ space group (referred to in the rest of the present description by the term "disordered crystal habit"), containing 0.2 mol % of europium, in the form of ions which are incorporated, as a replacement for barium ions, into one or other of the two cationic sites in the crystal lattice of the said component, with those of a luminescent material according to the prior art (referred to in the rest of the present description by the term "PH phosphor"), and essentially consisting of a mixed oxide of formula $Ca_5(PO_4)_3F:Sb:Mn$.

Curves 21 and 23 (FIG. 2a) show the variation in the light-emission intensity (expressed in arbitrary units) as a function of the wavelength (in nm) of the radiation emitted, of the compound $BA_{6.998}Eu_{0.002}F_{12}Cl_2$, in the disordered crystal habit, activated with europium, for excitation radiation having a wavelength of 356 nm ("soft" ultraviolet radiation) and a wavelength of 254 nm ("hard" ultraviolet radiation), respectively.

Curves 22 and 24 (FIG. 2a) are the respective emission curves for the "PH phosphor" for excitation radiation corresponding to the same wavelengths as in the cases of curves 21 and 23, respectively. It may be seen that, for "soft" ultraviolet excitation radiation, the compound $Ba_{6.998}Eu_{0.002}F_{12}Cl_2$ exhibits high luminescence intensities over a wide emission frequency range in the visible part of the spectrum (corresponding to a "white" luminescence colour), whereas the luminescence intensities of the "PH phosphor" remain low over this frequency range, despite a small peak.

In the case of "hard" ultraviolet excitation radiation, the compound $Ba_{6.998}Eu_{0.002}F_{12}Cl_2$ exhibits a maximum emission intensity less than that of the "PH phosphor", but with a wider distribution of the emission intensities in the emission frequency range, that is to say a luminescence colour which is whiter than that of the "PH phosphor".

Curves 25 and 26 (FIG. 2b) are the respective emission curves for the compound $Ba_{6.998}Eu_{0.002}F_{12}Cl_2$ and for The "PH phosphor" for excitation radiation having a wavelength of 337 nm ("soft" ultraviolet). It may be seen that, for such a wavelength, the luminescence intensity of the compound $Ba_{6.998}Eu_{0.002}F_{12}Cl_2$ is markedly higher (about 10 to 15 times) than that of the "PH phosphor", with a wide distribution of the emission intensity as a function of the frequency.

Figure 3A:
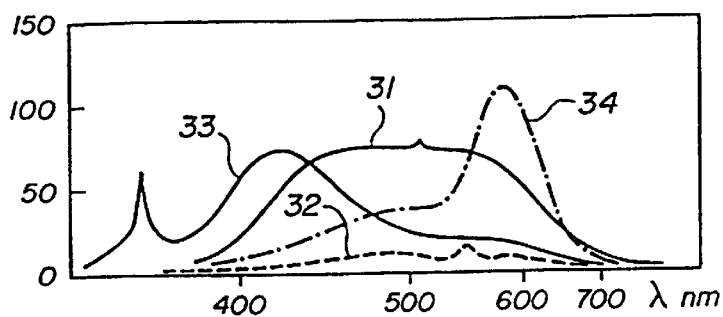
FIGS. 3a and 3b are comparative diagrams showing the characteristic light-emission curves for a second crystal habit of the said mineral compound, for the same excitation radiation wavelength as in the case of FIG. 2.
Figure 3B:
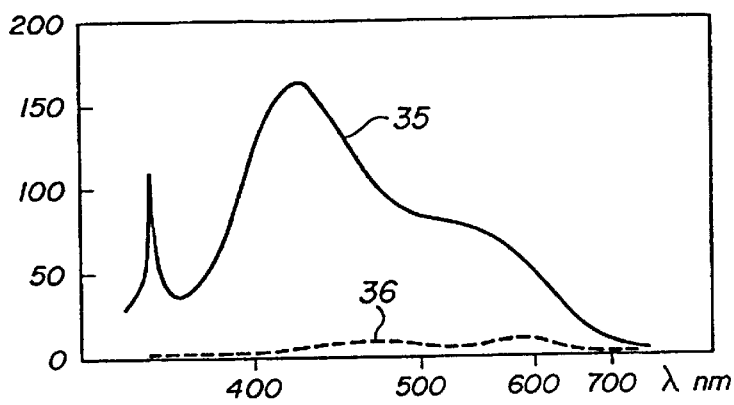

The curves 31 to 36 of the diagrams in FIG. 3a and FIG. 3b correspond to the curves 21 to 26 of FIG. 2a and FIG. 2b and relate to the compound of formula $Ba_{6.998}Eu_{0.002}F_{12}Cl_2$ (with the addition of lithium chloride LiCl) in a second hexagonal crystal habit, of structure corresponding to the P $\bar{6}$ space group (referred to in the rest of the present description by the term "ordered crystal habit"), containing 0.2 mol % of europium, in the form of ions incorporated, as a replacement for barium ions, into a cationic site in the crystal lattice.

These diagrams show that the luminescence characteristics of the ordered crystal habit of the compound $Ba_7F_{12}Cl_2$ are similar to those of the disordered crystal habit, while illustrating the fact that the addition of lithium chloride make it possible to modify these characteristics. More specifically, this modification is manifested by the presence of an intensity peak in the near ultraviolet, for excitation radiation wavelengths having values of 254 nm (curve 33) and 337 nm (curve 35).

The diagram in FIG. 4 shows the variation in the luminescence intensity (expressed in arbitrary units) of the compound of formula $Ba_{7-y}Eu_yF_{Cl2}$, in the disordered crystal habit, activated by the insertion of europium ions, as a function of the europium content, indicated by the ratio of the number of europium atoms to the total number of barium and europium atoms, for the 560 nm luminescence wavelength reference value at a temperature of 300 K, and excitation radiation wavelengths of 256 nm (curve 41), 337 nm (curve 42) and 356 nm (curve 43), respectively.

This diagram shows that there is a rapid increase in the luminescence activation effect as of a function of the europium content for value of this content up to approximately 0.3% in the case of curves 42 and 43 and 0.2% in the case of curve 41, with saturation of this activation effect corresponding to a slow decrease for europium contents greater than approximately 1% in the case of curve 41 and 4% in the case of curves 42 and 43.

The diagram in FIG. 5 shows the respective luminescence curves (the variation in emission intensity, expressed in arbitrary units, as a function of the wavelength of the luminescence radiation) for an excitation wavelength of 356 nm, at a temperature of 300 K, in the case of the compound of formula $Ba_{6.999}Eu_{0.001}F_{12}Cl_2$ in the disordered crystal habit (curve 51), as well as of the corresponding compound of formula $Ba_{6.469}Eu_{0.001}Ca_{0.53}F_{12}Cl_2$ (that is to say the compound of formula $Ba_{6.999-x}Eu_{0.001}Ca_xF_{12}Cl_2$ in which x=0.53) (curve 53) and $Ba_{6.759}Eu_{0.001}Mg_{0.24}F_{12}Cl_2$ (that is to say the compound of formula $Ba_{6.999-x}Eu_{0.001}Mg_xF_{12}Cl_2$ in which x=0.24) curve 52). It should be noted that, in order to make the diagram clearer, curves 52 and 53 have been shifted vertically with respect to curve 51, with shifts corresponding to $0.4 \times 10^5$ and $0.8 \times 10^5$ units, respectively.

It may be seen that substituting some of the barium with magnesium allows the luminescence intensity to be uniformly increased for all the emission frequencies of the base compound, whereas partial substitution of the barium with calcium results in a non-uniform increase in this intensity with, in particular, a large intensity peak in the blue-violet part of the light spectrum.

The mineral compound of formula $Ba_{6.998-x}Eu_{0.002}M_xF_{12}Cl_2$ may be prepared in any suitable manner, especially by using the standard general methods for obtaining compounds of this kind.

By way of non-limiting examples of particularly advantages processes, mention may especially be made of the process, known per se, usually referred to by the term "flux method".

Thus, it is possible to obtain the compound of formula $Ba_{6.998}Eu_{0.002}F_{12}Cl_2$ in the disordered crystal habit by melting a mixture of 70 to 90 mol % of barium fluoride $BaF_2$ and 10 to 30 mol % of sodium chloride NaCl at a temperature greater than 770° C., followed by slow cooling of the molten mass down to room temperature. During this cooling, the compound $Ba_{6.998}Eu_{0.002}F_{12}Cl_2$ crystallizes into needles which are separated from the mass of flux (sodium chloride) by washing with hot water.

As a variant, it is possible to replace up to approximately 25 mol % of the sodium chloride with another flux salt, such as potassium chloride KCl, Sodium bromide Na Br, sodium fluoride NaF, Lithium chloride LiCl or lithium fluoride LiF, without modifying the result.

On the other hand, partial replacement of the barium floride (up to a molar fraction of 2/7) with at least one divalent metal fluoride (chosen from calcium fluoride $CaF_2$, magnesium fluoride $MgF_2$, strontium fluoride $SrF_2$ and zinc fluoride $ZnF_2$) makes it possible to obtain mixed crystals of the mineral compound $Ba_{6.998-x}Eu_{0.002}M_xF_{12}Cl_2$ in which M represents at least one divalent metal chosen from calcium, magnesium, strontium and zinc.

Similarly, it is also possible to obtain the compound of formula $Ba_{6.998}Eu_{0.002}F_{12}Cl_3$ from a mixture of barium chloride $BaCl_2$, or barium fluorochloride BaFCl, and of sodium floride NaF, acting as the flux.

It is also possible to obtain the compound $Ba_7F_{12}Cl_2$ by a solid-state reaction at 700° C. of barium fluoride $BaF_2$ with sodium chloride.

The compound of formula $Ba_{6.998}Eu_{0.002}F_{12}Cl_2$ may be obtained in the ordered crystal habit by melting a mixture of 85% mol % of barium floride $BaF_2$ and 15 mol % of lithium chloride LiCl at approximately 900° C., slowly cooling the molten mass and separating the acicular crystals of the "ordered" $Ba_{6.998}Eu_{0.002}F_{12}Cl_2$ compound thus formed from the flux by washing with hot water, in a similar manner to the preparation, described above, of the disordered crystal habit of this same compound.

As in the case of the preparation of the disordered crystal habit, it is possible to replace, during the preparation of the ordered crystal habit, some of the lithium chloride, acting as the flux, with potassium chloride KCl.

Likewise, it is possible to obtain mixed crystals, corresponding to the ordered crystal habit, of the compound of formula $Ba_{6.998-x}Eu_{0.002}Ca_xF_{12}Cl_2$ by partial replacement of the barium fluoride with calcium fluoride $CaF_2$.

Luminescent compounds of formula $Ba_{0.998-x}Eu_{0.002}M_xF_{12}Cl_2$ which are activated by inserting europium ions into their crystal lattices may be obtained in a manner similar to the preparations that have just been described, with the addition into the salt mixtures used of suitable amounts of europium salts corresponding to the barium salts, for example by substituting an amount of about 0.3 mol % of barium fluoride $BaF_2$ with europium fluoride $EuF_2$, and by melting the ingredients of the mixture used and cooling the molten masses obtained in an inert atmosphere.

What is claimed is:

1. Electric discharge lamp, comprising an envelope at least part of which consists of a transparent wall whose inner surface is at least partly covered with a coating of luminescent material capable of emitting visible light due to the effect of being irradiated by ultraviolet excitation radiation, the lamp furthermore comprising means for producing such radiation, characterized in that the said luminescent material consists of least partly of a luminescent compound of formula:

in which

M represents at least one divalent metal chosen from calcium, magnesium, strontium and zinc;

x is a number between 0 and 2;

y is a number between 0.00001 and 2;

X and Y each represent an element, which is identical or different, chosen from chlorine and bromine; and u and v are numbers between 0 and 2, the sum of which is equal to 2.

2. Lamp according to claim 1, characterized in that the said luminescent compound contains, in addition to europium, oxygen in the form of ionized atoms inserted into cationic and/or interstitial sites and into anionic and/or interstitial sites in its crystal lattice respectively, in an amount suitable for activating its light-emitting properties.

3. Lamp according to claim 2, characterized in that the said luminescent compound corresponds to the formula:

in which

M represents at least one divalent metal chosen from calcium, magnesium, strontium and zinc;

x is a number between 0 and 2;

y is a number between 0.00001 and 2.

4. Lamp according to claim 1, characterized in that the said means for producing the ultraviolet radiation for exiting the luminescent material comprise a nitrogen atmosphere, under a pressure of between 0.01 and 40 mmHg, contained in the said envelope, and at least two electrodes connected to an electrical circuit making it possible for a potential difference to apply between them which is capable of causing a series of electrical discharges in this atmosphere.

5. Luminescent material capable of emitting visible light due to the effect of being irradiated by ultraviolet excitation radiation, characterized in that it consists at least partly of a luminescent compound of formula:

M represents at least one divalent metal chosen from calcium, magnesium, strontium and zinc;

x is a number between 0 and 2;

y is a number between 0.00001 and 2;

X and Y each represents an element, which is identical or different, chosen from chlorine and bromine; and u and v are numbers between 0 and 2, the sum of which is equal to 2.

6. Luminescent material according to claim 5, characterized in that the said luminescent compound contains europium and/or oxygen, in the form of ionized atoms inserted into cationic and/or interstitial sites and into anionic and/or interstitial sites in its crystal lattice respectively, in an amount suitable for activating its light-emitting properties.

7. Luminescent material according to claim 5, characterized in that it contains, in addition to the said luminescent compound, at least one alkali or alkaline-earth metal halide and/or at least one mixed salt of such halides.

8. Luminescent compound of formula:

$$Ba_{7-x-y}M_xEu_yF_{12}X_uY_v$$

in which

M represents at least one divalent metal chosen from calcium, magnesium, strontium and zinc;

x is a number between 0 and 2;

y is a number between 0.00002 and 2;

X and Y each represent an element, which is identical or different, chosen from chlorine and bromine; and u and v are numbers between 0 and 2, the sum of which is equal to 2.

9. Luminescent mineral compound according to claim 8, characterized in that it contains, in addition to europium, oxygen in the form of ionized atoms inserted into cationic and/or interstitial sites and into anionic and/or interstitial sites in its crystal lattice respectively, in an amount suitable for activating its light-emitting properties.

10. Compound according to claim 9, characterized in that it corresponds to the formula:

$$Ba_{7-x-y}M_xEu_yF_{12}Cl_2$$

in which

M represents at least one divalent metal chosen from calcium, magnesium, strontium and zinc;

x is a number between 0 and 2;

y is a number between 0.00001 and 2.

11. Compound according to claim 8, characterized in that it has a hexagonal crystal habit of structure corresponding to the $P6_2m$ space group.

12. Compound according to claim 8, characterized in that it has a hexagonal crystal habit of structure corresponding to the $P\overline{6}$ space group.

* * * * *